United States Patent
DeLong et al.

(10) Patent No.: US 10,475,267 B2
(45) Date of Patent: Nov. 12, 2019

(54) VEHICLE FINDER CARD WITH A THIN FILM BATTERY

(71) Applicant: Ford Global Technologies, LLC, Dearborn, MI (US)

(72) Inventors: Aaron Matthew DeLong, Toledo, OH (US); John Robert Van Wiemeersch, Novi, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/792,722

(22) Filed: Oct. 24, 2017

(65) Prior Publication Data

US 2019/0122464 A1     Apr. 25, 2019

(51) Int. Cl.
```
B60R 25/00      (2013.01)
G05B 19/00      (2006.01)
G05B 23/00      (2006.01)
G06F 7/00       (2006.01)
G06F 7/04       (2006.01)
G08B 29/00      (2006.01)
G08C 19/00      (2006.01)
H04B 1/00       (2006.01)
H04B 3/00       (2006.01)
H04Q 1/00       (2006.01)
H04Q 9/00       (2006.01)
G07C 9/00       (2006.01)
B60R 25/20      (2013.01)
```

(52) U.S. Cl.
CPC .......... G07C 9/00309 (2013.01); B60R 25/20 (2013.01); G07C 9/00944 (2013.01); *B60R 2325/103* (2013.01); *G07C 2009/00865* (2013.01); *G07C 2009/00976* (2013.01)

(58) Field of Classification Search
CPC ............ G07C 9/00309; G07C 9/00944; G07C 2009/00865; G07C 2009/00976; B60R 25/20; B60R 2325/103
USPC ........................................................ 340/5.72
See application file for complete search history.

(56) References Cited

U.S. PATENT DOCUMENTS

```
8,798,809  B2    8/2014  Kalhous et al.
9,961,489  B2 *  5/2018  Elias ................... H04L 63/0861
9,963,107  B2 *  5/2018  Murar ..................... B60R 25/24
2011/0112969 A1  5/2011  Zaid et al.
2016/0055699 A1  2/2016  Vincenti
```
(Continued)

FOREIGN PATENT DOCUMENTS

```
CN          206193989 U       5/1917
DE       102011011697 A1     12/2011
WO         WO 0125572 A1      4/2001
```

*Primary Examiner* — Tanmay K Shah
(74) *Attorney, Agent, or Firm* — Frank Lollo; Eversheds Sutherland (US) LLP (57) ABSTRACT

Method and apparatus are disclosed for a vehicle finder card with a thin film battery. An example includes a finder card and a vehicle. The finder card includes a thin film battery, a mechanical button flush with a surface of the finder card, a passive near field communication module and an active wireless module. The active wireless module broadcasts a wireless message with a command based on a pattern of the button being pressed. The vehicle provides a plurality of audiovisuals alert based on the command in the wireless message.

20 Claims, 3 Drawing Sheets (56) References Cited

U.S. PATENT DOCUMENTS

2017/0168479 A1 6/2017 Dang Van Nhan
2017/0338848 A1* 11/2017 Sharma ............. H04W 52/0235

* cited by examiner

VEHICLE FINDER CARD WITH A THIN FILM BATTERY

TECHNICAL FIELD

The present disclosure generally relates to vehicles with valet modes and, more specifically, a vehicle finder card with a thin film battery.

BACKGROUND

Increasingly, vehicles are being manufactured with passive entry passive start (PEPS) systems that incorporate a driver's mobile device. In such Phone-as-a-Key (PaaK) systems, the driver typically does not carry a traditional key fob or a physical key. As such, if the mobile device is out of power, the driver may not be able enter their vehicle until the battery of the mobile device is recharged. Further, when the driver does not want to share their phone, the valet may not have a convenient method of moving the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a vehicle finder card with a thin film battery. An example includes a finder card and a vehicle. The finder card includes a thin film battery, a mechanical button flush with a surface of the finder card, a passive near field communication module and an active wireless module. The active wireless module broadcasts a wireless message with a command based on a pattern of the button being pressed. The vehicle provides a plurality of audiovisuals alert based the command in the wireless message.

An example method includes receiving, from a finder card with a mechanical button and a thin film battery, a message with a command based on a pattern of the button being pressed. The method also includes, when a vehicle is in a valet mode, controlling, with the vehicle, lights to provide one of a plurality of audiovisuals alerts based the command in the message.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles equipped with passive entry passive start (PEPS) systems that use a phone-as-a-key (PaaK) system provide keyless access to the vehicle using the phone of the driver. However, drivers may worry about situation where the phone does not have power when they need to access their vehicle. Additionally, drivers do not want to give valets access to their phone in order to take advantage of valet parking.

As disclosed below, a vehicle includes one or more low-power card devices that perform vehicle finder functions and provide access to the vehicle as if they were key fobs or phones. Additionally, in some examples, when a valet mode is activated, the finder card provides access to the vehicle such that some of the functions of the vehicle are limited (e.g., maximum speed, distance, sound system, etc.). The card is sized to fit into a wallet. In some examples, the finder card is the size of a credit card plane (e.g., 85.60× 53.98 millimeters (mm) (3.370×2.125 inches)). On other examples, the finder card may also be the same thickness as the industry standard for credit cards (0.76 mm (0.03 inches)). The card includes both a passive near field communication (NFC) module and an active wireless module (such as Bluetooth®, Bluetooth® Low Energy (BLE), or Wi-Fi® HaLow, etc.). Additionally, the card includes a button and a thin film battery. The vehicle includes an internal NFC reader with a holder to store the finder card. Additionally, the vehicle includes an active wireless module to facilitate communicating with the finder card to perform car finding functions. The vehicle also includes an externally accessible NFC reader to facilitate access to the vehicle. For example, the vehicle may include an NFC reader in the B-pillar or a handle of the vehicle on the driver side.

The button of the finder card is a mechanical button that, when not depressed, is flush with a surface of the finder card. The active wireless module is normally in a low power inactive state. Pressing the button temporarily activates the active wireless module to broadcast a message to the vehicle via the active wireless module. When the vehicle receives the message, the vehicle activates an audio and/or visual alert (e.g., activates the horn, flashes the lights, etc.). In some examples, different button press patterns generate messages with different content to cause different alerts by the vehicle. For example, pushing the button twice in rapid succession may cause the vehicle to activate the horn or flash headlights once while holding the button down for three seconds may cause the vehicle to periodically activate the alert until the vehicle detects the finder card.

The finder card communicates with the vehicle via NFC to provide access to the vehicle. When the finder card is within range of the external NFC reader of the vehicle, the finder card and the vehicle communicate to unlock the door(s) to the vehicle. Alternatively, in some examples, the finder card initiates passive entry with the vehicle via the active wireless signal when the button is pressed when the card is proximate (e.g., two feet, five feet, ten feet) to the vehicle (e.g., as calculated by the received signal strength (RSSI) of the message broadcast by the finder card). The authentication process between the finder card and the vehicle may be similar or identical to the protocol for passive entry passive start (PEPS). In some examples, the finder card initiates passive entry with the vehicle upon detecting the vehicle (e.g., via a wireless beacon message, being proximate the NFC module, etc.) unless the battery of the finder card is depleted. In some examples, when valet mode is activated, when entry into the vehicle occurs with the finder card, the vehicle restricts functionality of some subsystems of the vehicle. In some such examples, when entry into the vehicle occurs with a mobile device (e.g., a smart phone, a smart watch, etc.), the vehicle does not restricts functionality of some subsystems of the vehicle and disables the valet mode. When the finder card is placed in the holder inside the vehicle, the internal NFC reader wirelessly charges the battery of the finder card when the ignition of the vehicle is on or is in delayed accessory power mode or in back-up power port mode if no other valid key is detected in the vehicle cabin. In some examples, the vehicle ignores the finder card unless an option is enabled (e.g., via an infotainment system). This may be the same option as enabling valet mode or may be an option separate from enabling valet mode. For example, to enable the use of the finder card, the driver may be required to enter a passcode into the infotainment system.

The battery of the finder card is a thin film battery. In some examples the battery, the printed circuit board (PCB), the electronic components (e.g., the NFC module and the active wireless module), and the button are configured so that the finder card has a thickness of a credit card (e.g., 0.76 mm (0.03 inch)). Additionally, the finder card is encapsulated in a flexible plastic that provides access to the button. The PCB and the thin film battery are flexible so that the finder card is resilient when carried in a wallet. Additionally, the electronic components and the button are oriented so to minimize torsional stress due to flexing or bending of the finder card.

Figure 1:
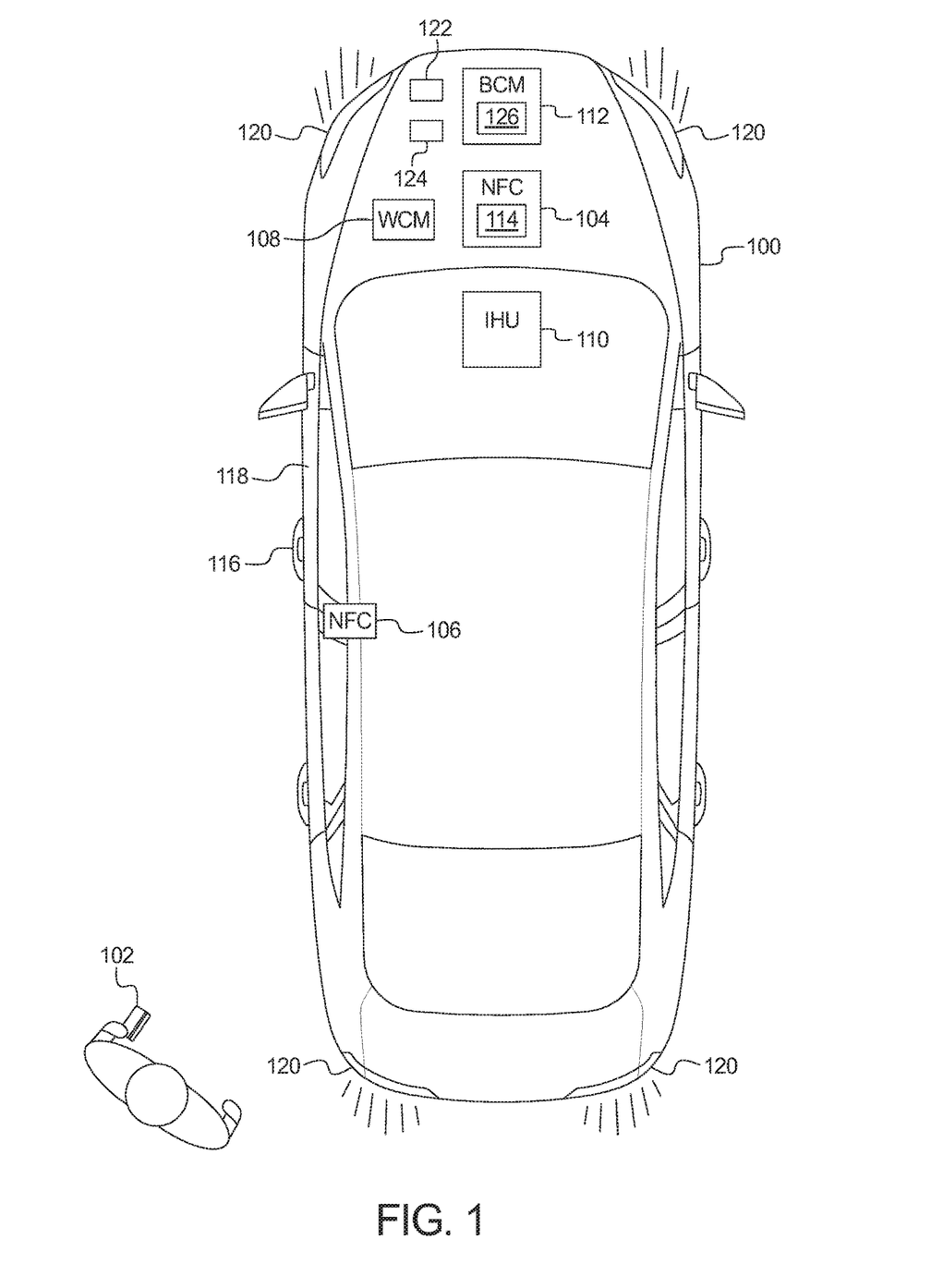
FIG. 1 illustrates a vehicle and a finder card operating in accordance with the teachings of this disclosure.

FIG. 1 illustrates a vehicle 100 and a finder card 102 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an internal near field communication module 104, an external near field communication module 106, a wireless communication module (WCM) 108, an infotainment head unit (IHU) 110, and a body control module (BCM) 112.

The internal and external NFC modules 104 and 106 include antennas and hardware (e.g., processors, integrated circuits, etc.) to communicate using near field communication protocols (e.g., as defined by ISO/IEC 18092). The NFC modules 104 and 106 have a range of 25.4 to 101.6 mm (1 to 4 inches). The internal NFC module 104 includes a holder configured to store the finder card 102. For example, the NFC module 104 may have a housing embedded in the center console with a movable cover that covers a slot configured to receive the finder card 102. The internal NFC module 104 includes an induction coil 114 to inductively charge the finder card 102 when the finder card 102 is disposed within the housing and the ignition of the vehicle 100 is on or in accessory or back-up power modes. The external NFC module 106 is located on the vehicle 100 so the finder card 102 can be within range of the NFC module 106 while the finder card 102 is outside the vehicle 100. In some examples, the external NFC module 106 is located in a handle 116 of the driver's side forward door 118. Alternatively, in some examples, the external NFC module 106 is located on a portion the door 118 that overlaps a B-pillar. In some such examples, the external NFC module 106 is incorporated into a keyless entry unit that includes a keypad. Examples of keyless entry units that can be modified to incorporate the external NFC module 106 are described in U.S. patent application Ser. No. 15/238,390, entitled "Vehicle Communication Status Indicator," filed Aug. 16, 2016, which is herein incorporated by reference in its entirety.

The wireless communication module 108 includes wireless network interfaces to enable communication with modules devices (e.g., smart phones, smart watches, etc.) and/or external networks. The wireless communication module 108 also includes hardware (e.g., processors, memory, storage, antenna, etc.) and software to control the wireless network interfaces. The example wireless communication module 108 includes communication controllers for Bluetooth® and/or Bluetooth® Low Energy. Additionally or alternatively, in some examples, the wireless communication module 108 include communication controllers for other personal area network (e.g., Zigbee®, Z-Wave®, etc.) and/or wireless local area networks (e.g., IEEE 802.11 a/b/g/n/ac or others, etc.).

The infotainment head unit 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display.

The body control module 112 controls various subsystems of the vehicle 100. For example, the body control module 112 may control power windows, power locks, an immobilizer system, and/or power mirrors, etc. The body control module 112 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control modules 112 controls the lights 120, horn 122, and alarm 124 of the vehicle 100. In the illustrated example, the body control module 112 includes a card handler 126.

The card handler 126 (a) generates different alerts that are different combinations and/or patterns of the lights 120, the horn 122, and/or the alarm 124 based on content in a message received, via the wireless communication module 108, from the finder card 102 and (b) provides access to the vehicle 100 (e.g. by unlocking the door 118) after detecting and authorizing the finder card 102 via the external NFC module 106. The messages received from the finder card 102 include different commands. Based on the command, the card handler 126 generates the corresponding alert. For example, one command may be associated with a single activation of the horn and another command may be associated with a periodic flashing of the lights. When the finder card 102 is within range of the external NFC module 106, the card handler 126 exchanges information (e.g., authorization token(s), etc.) with the finder card 102 to determine whether the finder card 102 is authorized to access the vehicle 100. When the finder card 102 is authorized to access the vehicle 100, the card handler 126 unlocks the door 118. In some examples, the card handler 126 may be configured to unlock all doors.

Alternatively or additionally, in some examples, the card handler 126 authorizes the finder card 102 via the wireless communication module 108 in response to a PEPS command included in the message received from the finder card 102. For example, the finder card 102 may send a PEPS command when the user presses a button on the finder card 102 in a certain pattern while the finder card 102 is proximate the vehicle 100. Via the wireless communication module 108, the card handler 126 interrogates the finder card 102 to determine whether finder card 102 is authorized to access the keyless entry and/or keyless start functions of the vehicle 100. Once authorized, the card handler 126 unlocks the door 118. In some examples, the card handler 126 unlocks one or more doors of the vehicle 100 in response to receiving key fob commands from the finder card 102 via the wireless communication module 108.

In some examples, the card handler 126 manages different modes to control functions of subsystems (e.g., a powertrain control unit, a sound system, etc.) in the vehicle 100. The modes include a normal mode, an alert-enabled mode, an entry-enabled mode, and/or a valet mode. In the normal mode, the card handler 126 ignores all the messages from the finder card 102. In the alert-enabled mode, the card handler 126 performs actions based on messages that include commands related to the alert, but does not unlock the door 118 via the external NFC module 106 or the wireless communication module 108. In the entry-enabled mode, the card handler 126 performs actions based on messages that include commands related to the alert and unlocks the door 118 via the external NFC module 106 or the wireless communication module 108. In the valet mode, the card handler 126 (i) performs actions based on messages that include commands related to the alert, (ii) unlocks the door 118 via the external NFC module 106 or the wireless communication module 108, and (iii) changes setting and/or restricts access to various subsystems of the vehicle 100 when the finder card 102 is used to unlock the door 118. For example, the infotainment head unit 110 may disable the infotainment system and/or the sound system, and the powertrain control module may limit the speed and/or acceleration rate of the vehicle 100. In some examples, when in valet mode, the card handler 126 does not change setting and/or restricts access to various subsystems of the vehicle 100 when an authorized mobile device or key fob is used to open the door 118.

In some examples, an interface on the infotainment head unit 110 (e.g., a touch screen, a display with associated physical buttons, etc.) facilitates the driver changing the modes. In some such examples, the card handler 126 changes modes in response to a selection after (a) the driver inputs credentials (e.g., a password or passcode) and/or (b) detecting that the finder card 102 is docked in the slot associated with the internal NFC module 104.

Because long distance wireless communications (e.g., car finder, remote start, etc.) require power, the finder card 102 is rechargeable to allow power reserve to be held by the card during extended valet events or time away from the vehicle. When the finder card 102 is docked in the slot associated with the internal NFC module 104 and the ignition is on, the card handler 126 charges the battery of the finder card 102 via inductive coupling using the induction coil 114. In some examples, to wirelessly recharge, the finder card 102 is placed on top of or adjacent to the internal NFC module 104 (e.g., when the internal NFC module 104 does not include a slot). In some examples, the card handler 126 charges the finder card 102 in accordance with the Qi® Standard but it may also use other methods such as magnetic resonance to acquire charge. However, if the battery of the finder card 102 does not have enough power to communicate wirelessly, because the NFC module of the finder card is passive, the finder card 102 still communicates with the external NFC module 106 of the vehicle 100.

Figure 2:
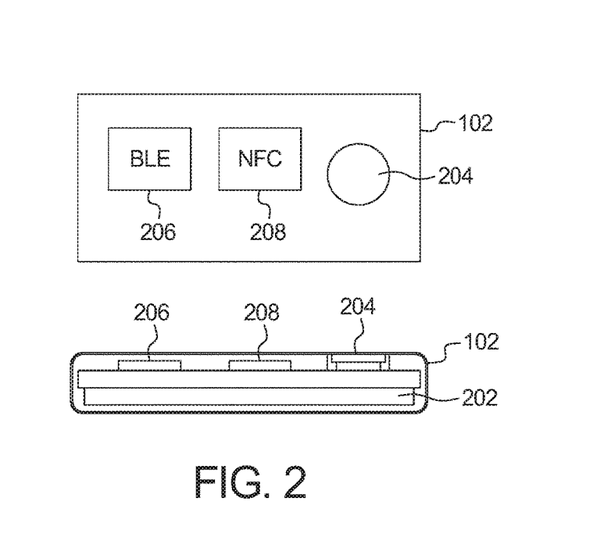
FIG. 2 illustrates the vehicle finder card used to access the vehicle of FIG. 1.

FIG. 2 illustrates the finder card 102 used to access the vehicle of 100 FIG. 1. The finder card 102 includes a printed circuit board (PCB) and a battery 202 that are covered by a flexible plastic layer. The printed circuit layer may be implemented in various forms such as printed on Mylar® film or building additive copper deposits into the plastic housing of the finder card. In some examples, the battery 202 is a thin film battery. Alternatively, in some examples, the battery is a thin or flat ultracap. The finder card 102 is configured to fit inside a wallet. In some examples, the finder card 102 is approximately 85.60 mm (3.370 inches)×53.98 mm (2.125 inches)×0.76 mm (0.03 inch). Additionally, the finder card 102 includes a mechanical button 204, an active wireless module 206 and a NFC module 208.

The battery 202 is a thin film battery. The PCB and the thin film battery 202 are flexible so that the finder card is resilient when carried in a wallet. Additionally, the electronic components (e.g., the NFC module 208 and the active wireless module 206), and the button 204 are oriented so as to minimize torsional stress due to flexing or bending of the finder card 102. The battery 202 is functional over an expected automotive cabin temperature range. In some examples, the battery 202 has an operating temperature range of −40° C. to 85° C. (−40° F. to 185° F.). In some examples, the battery 202 has a capacity from 1 milliamp hours (mAh) to 100 mAh. Thin film batteries have advantages over traditional chemical batteries. Traditional chemical batteries are rigid and comparatively thick. Such batteries are unsuitable for storing in a wallet because of the thickness of the battery and the stress caused by the torsional forces when a person sits down with the wallet in their back pocket. Additionally, chemical batteries typically have a limited temperature range (e.g., −20° C. to 60° C. (−4° F. to 140° F.)). As such, traditional chemical batteries cannot be stored in the cabin and expected to be ready for immediate use over the full expected range of a vehicle cabin. Additionally, thin film batteries have solid electrolytes, which are safer than the liquid electrolytes of traditional lithium ion batteries.

The button 204 is a mechanical button that is stiff enough to require a finger to intentionally press down on the button 204. The button 204 is electrically connected to the active wireless module 206. Additionally, the button 204 is flush with a surface of the finder card 102 to prevent unintentional activation with in a wallet. In some example, the finder card 102 may include one or more buttons that correspond to key fob commands (e.g., door lock, door unlock, open trunk, etc.) that are separate from the button 204. In such examples, the buttons to perform key fob commands are different from the button 204.

The active wireless module 206 includes hardware and software to communicate via the same wireless protocol as the wireless communication module 108 of the vehicle 100. The active wireless module 206 remains in a low-power mode (sometimes referred to as a "sleep mode") until the button 204 is pressed. Upon detecting activation of the button 204, the active wireless module 206 temporarily wakes up to communicate with the wireless communication module 108 of the vehicle 100. That is, the active wireless module 206 pairs with the vehicle 100, to broadcast a secure message with a command to the vehicle 100, and then returns to the low power mode. In some examples, the active wireless module 206 advertises unsecure messages to initiate the system without pairing with the vehicle 100. In some other examples, the active wireless module 206 broadcasts the message multiple times (e.g., five times, etc.) to account for an electromagnetically noisy environment that interferes with the vehicle 100 receiving some of the messages and then returns to the sleep mode. By waking up, broadcasting the messages, and then immediately returning to sleep mode, the active wireless module 206 conserves power. For example, the active wireless module 206 may only use 0.1 μA of current in a low power mode. In such an example, if the capacity of the battery 202 is 1.4 mAh, the finder card 102 would have power for approximately 550 days in low power mode.

The command included in the message broadcast by the active wireless module 206 depends on the pattern that the button 204 is pressed. The activation patterns include combination of long and short presses of the button 204. For example, a single short press may be associated with a command to flash the lights 120 of the vehicle 100, an extended press may be associated with a command to continually flash the lights 120 of the vehicle 100, two extended presses may be associated with a command to stop flashing the lights 120 of the vehicle 100, and two short presses in rapid succession may be associated with a command to activate the alarm 124 of the vehicle 100. In some examples, an extended press is any press of the button 204 that is greater than or equal to a threshold time (e.g., 2 seconds, 3 seconds, etc.). In such examples, a short press is any press of the button 204 that is less than the threshold time.

In some examples, the active wireless module 206 wakes up to perform passive entry passive start functions upon detection of a certain button press pattern. In such examples, the active wireless module 206 remains active and communicates with the vehicle 100 until the passive entry passive start functions are completed or the wireless module 206 active mode times out (in order to save battery charge in the finder card 102). In some such examples, the active wireless module 206 calculates a distance from the vehicle 100 based on a received signal strength indicator (RSSI) or a transmission strength (RX) of the messages received from the vehicle 100. In such examples, the active wireless module 206 wakes up to perform passive entry passive start functions in response to detecting the certain button press pattern when the finder card 102 is within a threshold distance (e.g., 2 feet, 5 feet, etc.) of the vehicle 100.

The NFC module 208 is a passive NFC device. The NFC module 208 (a) exchanges authentication tokens with the vehicle 100 to provide access to the vehicle, and (b) facilitates charging the battery 202 when the finder card 102 is place onto/into a wireless charger and/or the finder card 102 is held against a mobile device configured to provide wireless power transfer. The NFC module 208 includes an authentication key unique to the particular vehicle 100 and hardware (e.g., an integrated circuit and memory, etc.) to generate an authentication token when interrogated by the vehicle 100. In such a manner, the finder card 102, when authenticated, provides access to the vehicle 100 event when the useful charge of the battery 202 is depleted. The NFC module 208 is electrically coupled to the battery 202. When the finder card 102 is placed into or onto a wireless charger (e.g., such as the internal NFC module 104 of the vehicle 100), the NFC module 208 transfers the induced power to the battery 202.

Figure 3:
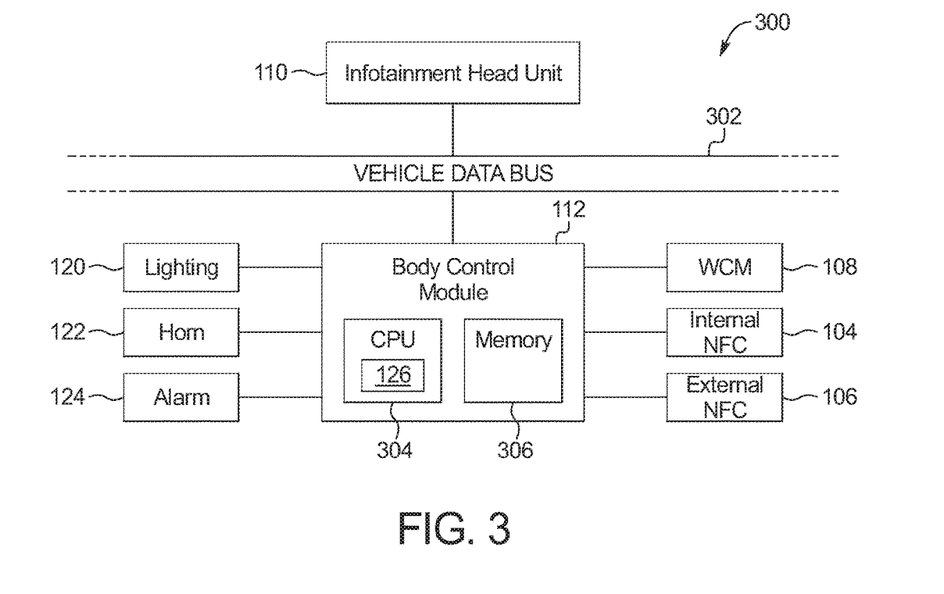
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the internal and external NFC modules 104 and 106, the wireless communication module 108, the infotainment head unit 110, the body control module 112, and a vehicle data bus 302.

In the illustrated example, the body control module 112 includes a processor or controller 304 and memory 306. In the illustrated example, the body control module 112 is structured to include the card handler 126. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the infotainment head unit 110 and the body control module 112. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc.

Figure 4:
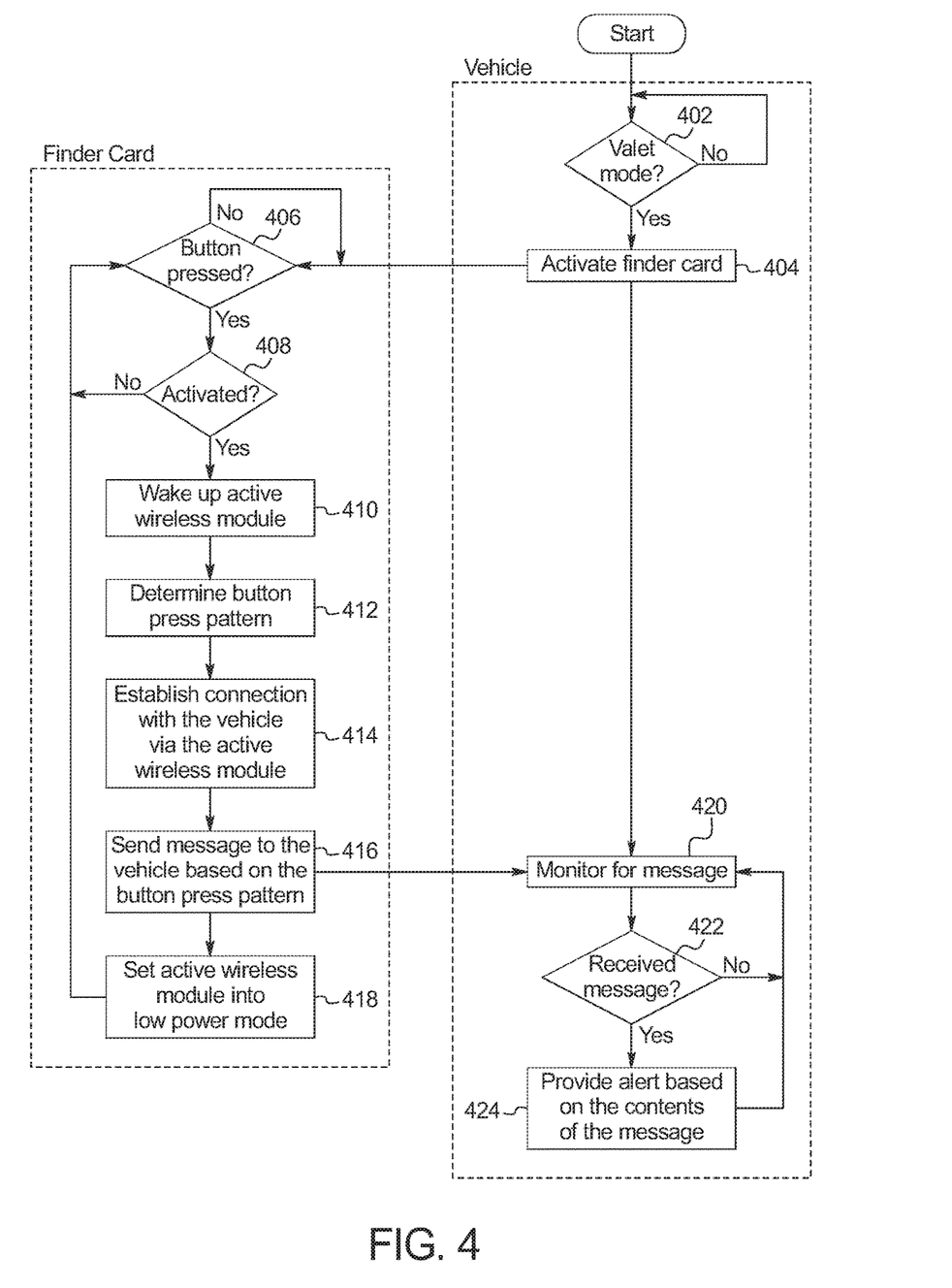
FIG. 4 is a flowchart of a method to find the vehicle of FIG. 1, which may be implemented by the vehicle finder card of FIGS. 1 and 2 and the electronic components of FIG. 3.

FIG. 4 is a flowchart of a method to find the vehicle 100 of FIG. 1, which may be implemented by the finder card 102 of FIGS. 1 and 2 and the electronic components 300 of FIG. 3. Initially at block 402, the card handler 126 waits until the vehicle 100 is in a valet mode or other mode (such as a "service mode") that restricts the functionality of the vehicle 100. For example, a driver may put the vehicle 100 in the valet mode via an interface on a touch screen of the infotainment head unit 110. At block 404, the card handler 126 activates the finder card 102. In some examples, activating the finder card 102 includes changing a setting to indicate that the commands and/or authentication tokens are to be recognized an acted upon. Alternatively or additionally, in some examples, activating the finder card 102 includes communicating a temporary authentication and/or session identifier to the finder card 102 via the internal NFC module 104.

At block 406, the finder card 102 waits until the button 204 is pressed. At block 408, the finder card 102 determines whether it has been activated (e.g., it has received a temporary authentication and/or session identifier from the vehicle 100). When the finder card 102 has been activated, the method continues at block 410. Otherwise, when the finder card 102 has not been activated, the method returns to block 406. At block 410, the finder card 102 wakes up the active wireless module 206. At block 412, the finder card 102 determines the pattern with which the button 204 was pressed. For example, the finder card 102 determines the number of extended and/or short presses. At block 414, the finder card 102 establishes a connection with the vehicle 100. At block 416, the finder card broadcasts, via the active wireless module 206, a message that includes a command based on the pattern of button presses determined at block 412. At block 418, the finder card 102 sets the active wireless module 206 into a low power mode.

At block 420, the card handler 126 of the vehicle 100 monitors for messages from finder card 102. At block 422, the card handler 126 determines whether a message has been received. When a message has been received, the method continues at block 424. Otherwise, when a message has not been received, the method returns to block 420. At block 424, the card handler 126 provides an alert based on the command included in the message. For example, a command may be associated with honking the horn of the vehicle. The card handler then continues to wait for other messages from the finder card 102.

The flowchart of FIG. 4 is representative of machine readable instructions stored in memory (such as the memory 306 of FIG. 3) that comprise one or more programs that, when executed by a processor (such as the processor 304 of FIG. 3), cause the vehicle 100 to implement the example card handler 126 or, more generally, the body control module 112 of FIGS. 1 and 3. Further, although the example program(s) is/are described with reference to the flowchart illustrated in FIG. 4, many other methods of implementing the example card handler 126 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
   a finder card including:
   a flexible film battery;
   a flexible printed circuit board;
   a mechanical button flush with a surface of the finder card;
   a passive near field communication (NFC) module; and
   an active a wireless module to broadcast a wireless message with a command based on a pattern of the button being pressed; and
   a vehicle configured to:
   enter a valet mode in response to a receiving a passcode, wherein the valet mode restricts at least one vehicle function, said vehicle function including infotainment system function and vehicle speed; and
   provide a plurality of audiovisuals alert based on the command in the wireless message only when the vehicle is in the valet mode.

2. The system of claim 1, wherein the finder card is sized to fit within a credit card holder in a wallet.

3. The system of claim 2, wherein the finder card has a length no greater than 90 millimeters, a width of no more than 60 millimeters, and a thickness of no more than 1 millimeter.

4. The system of claim 1, wherein the finder card further comprising a passive near field communication (NFC) module including authentication data and wherein the vehicle includes an external NFC module configured to receive the authentication data from the passive NFC module.

5. The system of claim 4, wherein, upon authorization of the finder card based on the authentication data, the vehicle is to unlock a door of the vehicle.

6. The system of claim 1, wherein the finder card further comprising a passive near field communication (NFC) module including authentication data, and wherein the vehicle includes an internal NFC module inside the vehicle configured to receive the authentication data from the passive NFC module.

7. The system of claim 6, wherein upon authorization of the finder card based on the authentication data, the vehicle is to enable an ignition switch of the vehicle.

8. The system of claim 7, wherein when the authentication data of the finder card is used to enable the ignition switch, the vehicle is to modify functionality of some subsystems of the vehicle.

9. The system of claim 1, wherein the wireless module includes a low power mode; wherein in response to detecting that the button has been pressed, the finder card is to wake up the wireless module, and wherein after broadcasting the wireless message, the finder card is to place the wireless module into the low power mode.

10. The system of claim 1, wherein the active wireless module of the finder card is to perform passive entry passive start functions in response to receiving a predefined pattern of the button being pressed.

11. The system of claim 1, wherein the pattern of the button being pressed includes a combination of one or more button presses selected from a group of a short press and an extended press.

12. The system of claim 1, wherein the vehicle is further configured to, responsive to entering the valet mode, activating the finder card.

13. The system of claim 1, wherein the command is a first command, and wherein the vehicle is further configured to, responsive to entering the valet mode, transmit, to the finder card, a second command, wherein the second command causes the finder card to be responsive to actuation of the mechanical button flush.

14. The system of claim 1, wherein the vehicle is further configured to, responsive to entering the valet mode, transmit, to the finder card, a temporary authentication or a session identifier to activate the finder card.

15. A method comprising:
transmitting, from a finder card with a flexible printed circuit board, a mechanical button and a flexible film battery, to a vehicle, a message with a command based on a pattern of the button being pressed;
causing the vehicle to enter a valet mode in response to receiving a passcode, wherein the valet mode restricts at least one vehicle function, said vehicle function including infotainment system function and vehicle speed; and controlling, with a processor of the vehicle, lights of the vehicle to provide one of a plurality of audiovisuals alerts based the command in the message only when the vehicle is in the valet mode.

16. The method of claim 15, including in response to receiving a passcode, activating, with the processor, the finder card when the finder card is docked into the vehicle via a near field communication module inside the vehicle.

17. The method of claim 15, including, when the vehicle is in the valet mode, interrogating the finder card to determine whether the finder card is authorized to access the vehicle when the finder card is within range of a near field communication module on the exterior of the vehicle.

18. The method of claim 17, wherein, when the finder card is authorized, unlocking, via the processor, a door of the vehicle.

19. The method of claim 17, wherein the finder card is interrogated using a first communication module and the message is received using a second communication module, the first communication module being different than the second communication module.

20. The method of claim 15, including, when the vehicle is in the valet mode, disabling functionality of a subsystem of the vehicle.

* * * * *